May 8, 1928.  1,668,584
W. COREY
TOOL TO FACILITATE MOUNTING VEHICLE SPRINGS UPON THE VEHICLE CHASSIS
Filed Sept. 11, 1926

Inventor
WALTER COREY
By Paul, Paul & Moore
ATTORNEYS

Patented May 8, 1928.

1,668,584

UNITED STATES PATENT OFFICE.

WALTER COREY, OF MINNEAPOLIS, MINNESOTA.

TOOL TO FACILITATE MOUNTING VEHICLE SPRINGS UPON THE VEHICLE CHASSIS.

Application filed September 11, 1926. Serial No. 134,876.

This invention relates to an improved tool particularly adapted for use to spread or elongate a vehicle spring to facilitate mounting it upon the vehicle chassis, and an object of the invention is to provide such a tool of simple and inexpensive construction, comprising a member adapted to grip the vehicle axle or chassis, adapted to have an expansible device such, for instance, as a jack, movably connected therewith and its other end adapted to engage one end of the spring, whereby the spring, after having one end secured to the chassis, may be spread or elongated sufficiently to permit the other end thereof to be conveniently secured to the other side of the chassis in the manner shown.

Other objects of the invention will appear from the following description and accompanying drawings and will be pointed out in the annexed claims.

In the drawings there has been disclosed a structure designed to carry out the various objects of the invention, but it is to be understood that the invention is not confined to the exact features shown, as various changes may be made within the scope of the claims which follow.

In the accompanying drawings forming part of this specification,

In the selected embodiment of the invention here shown for purposes of disclosure, there is illustrated a portion of an automobile chassis comprising the rear axle housing 6, differential case 7 and the usual brakes or brake drums 8 of the rear wheels 9.

Figure 1:
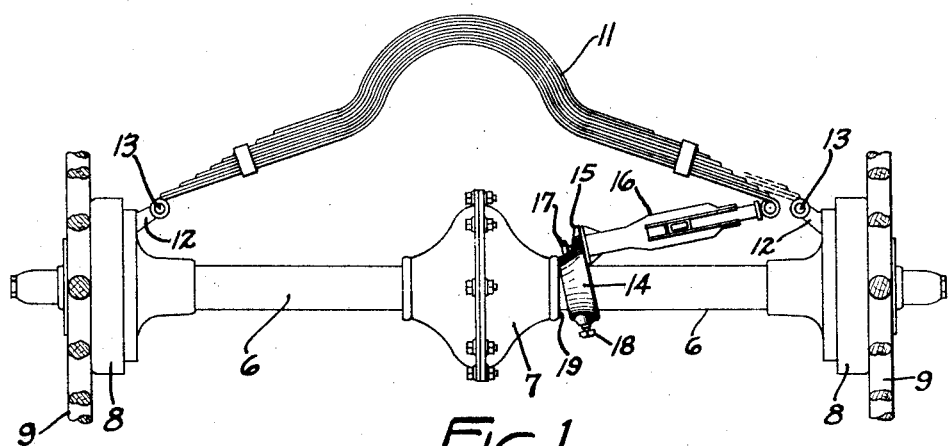
Figure 1 is a view showing a rear axle of an automobile with the device applied thereto and engaging one end of the spring.

The novel device or tool featured in this invention is particularly adapted for use to spread or elongate the usual spring 11 of the vehicle, so as to facilitate mounting it upon the chassis, as shown in Figure 1. One end of the spring 11 is first connected to one of the spring perches 12 as shown, after which the other end thereof is engaged by the tool and spread sufficiently to align it with the perch 12 so that the usual pin 13 may readily be inserted through the aligned openings in the spring and perch, after which the tool will be removed from the axle.

Figure 2:
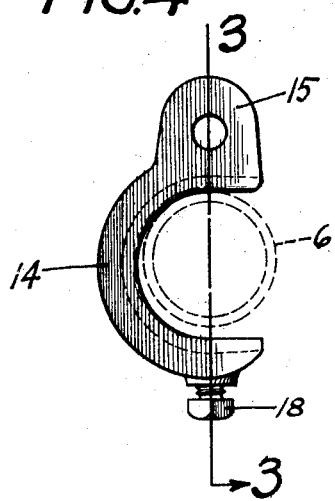
Figure 2 is an enlarged detail view of the U-shaped member which engages the axle or axle housing.
Figure 3:
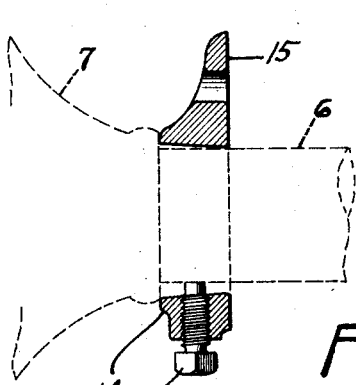
Figure 3 is a sectional view on the line 3—3 of Figure 2.

The tool consists of a U-shaped member 14 having an extension 15 thereon to which an expansible device such as a jack 16, may be connected. The U-shaped member 14 is mounted upon the axle or axle housing, as shown in Figures 1 and 2, and one end of the jack 16 is engaged with the detached end of the spring 11, after which the jack is operated to spread or elongate the spring 11 from the full to the dotted line position shown in Figure 1. The jack 16 is preferably loosely connected to the extension 15 of the member 11 by suitable means such, for instance, as a bolt 17, so that the member 14 will be inseparable from the jack 16 when the tool is not in use. A setscrew 18 is provided in the lower portion of the U-shaped member 14 to provide means for securing the member 14 to the axle in the event that it does not grip the axle when tilted at an angle as shown in Figure 1. In practice, the U-shaped member is usually engaged with the shoulder 19 of the differential case thereby positively locking it against longitudinal movement upon the axle housing when in operation.

By means of this novel tool, the operation of mounting a spring upon a vehicle chassis is greatly facilitated. It will be noted by reference to this figure that all strains exerted against the spring are confined within the axle housing and the spring being mounted thereon. By means of this simple tool, one man may readily and conveniently install a spring upon the vehicle chassis in a comparatively short time and without danger of injury as a result of the spring slipping or becoming disengaged from its spreading means as frequently happens when ordinary means are employed.

Figure 4:
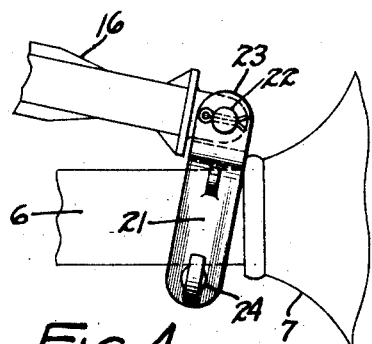
Figure 4 is a view illustrating a modified construction wherein a pin is used in connection with the U-shaped member to secure it to the axle.
Figure 5:
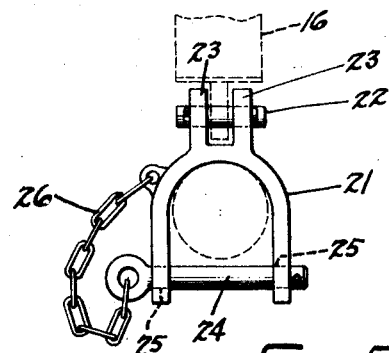
Figure 5 is an end elevation of Figure 4.

Figures 4 and 5 illustrate a modified construction wherein a U-shaped member 21 is pivotally connected to the jack 16 or other expansible device by such means as a pin 22, the member 21 having suitable lugs 23 to receive the pin 22. A bolt 24 is received in suitable apertures 25 provided in the lower portion of the member 21. The bolt 24 may be secured to the U-shaped member 21 by means of a chain 26, shown in Figure 5, thus preventing it from becoming separated from the tool.

I claim as my invention:

1. A device of the class described, comprising a substantially U-shaped one-piece member adapted to grip a vehicle axle, and a laterally extending integral extension on one leg of the member functioning to provide a support for one end of a jack, when the latter is engaged with a spring for the purpose specified.

2. A device of the class described, comprising a substantially U-shaped member adapted to grip a vehicle axle, there being an outwardly extending tongue on one leg of the member adapted to be engaged by a jack to provide an anchor therefor, said extension having one face flush with one side of the U-shaped member to provide a substantial step for the jack.

3. A device of the class described, comprising a substantially U-shaped member adapted to grip a vehicle axle, there being an outwardly extending tongue on one end of the member, flush with one side thereof and functioning to provide an anchor for a tool having its other end engaged with a vehicle spring, and means on the other leg of said member for securing the member to the vehicle axle.

4. A device of the class described, comprising a substantially U-shaped member adapted to grip a vehicle axle, there being an outwardly extending tongue integrally formed with one leg of the member and having one face flush with one side of said member functioning to provide a support for a tool, there being an aperture in said extension for securing the tool thereto, and a set-screw in the other leg of said member for securing the member to the vehicle axle.

In witness whereof, I have hereunto set my hand this 9th day of September, 1926.

WALTER COREY.